United States Patent
Park et al.

(10) Patent No.: US 9,578,998 B2
(45) Date of Patent: Feb. 28, 2017

(54) SKIN WASHING MACHINE USING BRUSHLESS DC MOTOR, METHOD OF CONTROLLING SAME, AND PROGRAM RECORDING MEDIUM FOR PERFORMING THE CONTROLLING METHOD

(71) Applicants: AMOREPACIFIC CORPORATION, Seoul (KR); SENTRONIX CO., Ltd., Suwon (KR)

(72) Inventors: Wooram Park, Seoul (KR); Sohee Kim, Seoul (KR); Yoonhee Lee, Seoul (KR); Cheonghwan Hwang, Seoul (KR); Hyeseong Nam, Seoul (KR); Kyung Shin Park, Suwon (KR); Chil Sung Lee, Suwon (KR)

(73) Assignees: AMOREPACIFIC CORPORATION, Seoul (KR); SENTRONIX CO., LTD., Suwon (KR)

( * ) Notice: Subject to any disclaimer, the term of this patent is extended or adjusted under 35 U.S.C. 154(b) by 532 days.

(21) Appl. No.: 14/006,001

(22) PCT Filed: Feb. 14, 2013

(86) PCT No.: PCT/KR2013/001160
§ 371 (c)(1),
(2) Date: Sep. 18, 2013

(87) PCT Pub. No.: WO2013/122400
PCT Pub. Date: Aug. 22, 2013

(65) Prior Publication Data
US 2014/0007362 A1    Jan. 9, 2014

(30) Foreign Application Priority Data

Feb. 16, 2012  (KR) ........................ 10-2012-0015793

(51) Int. Cl.
*A46B 13/02*     (2006.01)
*A46B 15/00*    (2006.01)
(Continued)

(52) U.S. Cl.
CPC ............ *A47K 7/043* (2013.01); *A46B 13/008* (2013.01); *A46B 15/0004* (2013.01); *A47K 7/04* (2013.01);
(Continued)

(58) Field of Classification Search
CPC ... A47K 7/043; H02P 6/18; H02P 6/20; H02P 6/182; A46B 13/008; A46B 15/0004
See application file for complete search history.

(56) References Cited

U.S. PATENT DOCUMENTS

| 4,203,431 A * | 5/1980 | Abura ................... A61H 7/005 15/28 |
| 8,484,788 B2 * | 7/2013 | Brewer .................. A46B 9/06 15/22.1 |

(Continued)

FOREIGN PATENT DOCUMENTS

| JP | 2009-207537 A | 9/2009 |
| JP | 2011-041447 A | 2/2011 |

(Continued)

OTHER PUBLICATIONS

International Search Report of PCT/KR2013/001160 Jun. 28, 2013.

*Primary Examiner* — Randall Chin

(57) ABSTRACT

Disclosed is a skin washing apparatus using a brushless DC motor, including: a case for the skin washing apparatus; an operation unit installed outside the case, for commanding an ON/OFF operation of the skin washing apparatus and an switching operation for forward and reverse rotations in unit of a predetermined angle; a brushless DC motor installed inside the case to be operated by electric power received (Continued)

from the power supply so as to be rotated forwardly and reversely in unit of a predetermined angle; a control unit for outputting an electrical signal for controlling forward and reverse rotations of the brushless electric motor by a predetermined angle in response to a switching signal of the operation unit; and a skin washing brush mounted on a shaft of the brushless electric motor to be rotated forwardly and reversely according to an operation of the brushless electric motor.

2 Claims, 13 Drawing Sheets

(51) Int. Cl.
*A47K 7/04* (2006.01)
*H02P 6/18* (2016.01)
*H02P 6/20* (2016.01)
*A61H 23/02* (2006.01)
*A61H 35/00* (2006.01)
*A46B 13/00* (2006.01)

(52) U.S. Cl.
CPC ....... *A61H 23/0263* (2013.01); *A61H 35/008* (2013.01); *H02P 6/182* (2013.01); *H02P 6/20* (2013.01); *A46B 2200/102* (2013.01); *A61H 2201/5038* (2013.01); *A61H 2201/5064* (2013.01); *A61H 2205/022* (2013.01)

(56) References Cited

U.S. PATENT DOCUMENTS

| | | | |
|---|---|---|---|
| 2011/0009783 A1 | 1/2011 | Dverin et al. | |
| 2012/0037184 A1* | 2/2012 | Czetty | A61Q 19/10 134/6 |

FOREIGN PATENT DOCUMENTS

| | | |
|---|---|---|
| KR | 10-0725811 B1 | 6/2007 |
| KR | 10-0827414 B1 | 5/2008 |

* cited by examiner

— PRIOR ART —

— PRIOR ART —

Clockwise motion

Counterclockwise motion

SKIN WASHING MACHINE USING BRUSHLESS DC MOTOR, METHOD OF CONTROLLING SAME, AND PROGRAM RECORDING MEDIUM FOR PERFORMING THE CONTROLLING METHOD

This application claims foreign priority of Korean Patent Application No. 10-2012-0015793, filed on Feb. 16, 2012, which is incorporated by reference in its entirety into this application.

BACKGROUND OF THE INVENTION

1. Field of the invention

The present invention relates to a skin washing apparatus using a brushless DC electric motor, and more particularly to a skin washing apparatus using a brushless DC electric motor by which facial skin can be optimally washed with minimum power consumption by applying a brushless DC electric motor and applying a forward/reverse operation mode at a predetermined angle at the same time.

2. Description of the Prior Art

In general, beauty of a human body is desired without distinction of age and sex and skin should be managed cleanly and systematically to achieve beauty of a human body, in particular, beauty of skin. To this end, skin care devices have been developed and used in various forms according to parts of the human body where the skin care devices are to be used to correspond to characteristic of the body parts.

In particular, methods for managing facial skin of the human body basically include skin care with cosmetics, and functional cosmetics are currently used for skin care.

Meanwhile, various apparatuses for washing facial skin have been proposed, which apparatuses largely correspond to a method of simply generating rotations when a washing brush is rotated, and a method of generating vibrations. Two vibration methods are generally applied to generate vibrations.

The method of rotating a washing brush simply through rotation of a motor is generally known in the art, and thus a further description thereof will be omitted. Hereinafter, a method of employing an eccentric disk and the basic concept of a motor which rotates in a spiral arc form will be briefly mentioned.

First, FIG. 1 shows a general eccentric rotation type vibration motor. As shown, a PCB positioning part is formed in a lower case 2 so that a PCB circuit board 6 may be positioned in the PCB positioning part 1. A permanent magnet 3 is fixedly installed at an upper portion of the lower case 2. A rotator 7 is rotatably installed above a stator, that is, the permanent magnet 3 while a gap being maintained between the stator and the rotator 7, and the rotator 7 includes a coil 8 and a segment 9 which are largely designed to be eccentric. In addition, the rotator 7 has an eccentric mass at one side thereof and functions as an eccentric mass.

The vibration motor requires a rectifying circuit by which coils through which current flows are changed according to a position of a rotator to rotate the rotator in a predetermined direction. A current circuit of a coin type vibration motor includes a brush 5 electrically connected to the PCB circuit 4 of the PCB circuit board 6, and a segment 9. In the principle of rotating the coin type vibration motor, the DC power input from the PCB circuit 4 flows to the coil through the segment 9 contacting the brush 5. Then, the segment 9 contacting the brush 5 is changed by the rotating rotator, rectifying the current.

Second, there is a vibration method employing a voice coil, which is most widely used in hard disk drives, and a schematic principle thereof will be described by using a hard disk drive. As shown in FIG. 2, a magnetic disk 110 is rotatably mounted to a spindle motor (not shown) installed in a base frame 100, a magnetic head actuator 200 driven to be rotated about a pivot shaft P to fly a magnetic head h on the disk 110, and a cover frame (not shown) coupled to the frame, for protecting the disk 110 and the magnetic head actuator 200 and interrupting introduction of foreign substances. Reference numeral 120 is a circuit driving part for transferring a signal between a main circuit board (not shown) interfacing with a device body such as a computer and the magnetic head h and controlling driving of the magnetic head actuator 200.

As shown in FIG. 3, the magnetic head actuator 200 includes a voice coil motor (VCM) 210 having a lower yoke 211 and an upper yoke 212 to which a pair of magnets M are attached to face each other, a swing arm 220 rotated about the pivot shaft P by the voice coil motor 210 as a head stack assembly (HSA), a suspension 230 supported by the swing arm 220 and having a magnetic head h at a tip end thereof, and a bobbin 230 branched to correspond to the swing arm 220 and on which a coil is wound to be located between the magnets M.

The voice coil motor 210 is a kind of driving motor for rotating the swing arm 220 to move the magnetic head h to a desired position on the disk and uses Fleming's left hand rule, that is, a principle of generating a force when current flows through a conductor. A force is applied to the bobbin 230 to rotate the bobbin 230 by applying current to the coil 231 located between the magnets M. Accordingly, as the swing arm 220 branched to correspond to the bobbin 230 is rotated, the magnetic head h supported at an end of the swing arm 220 flies radially on the rotating disk 110 to search for and access a track, and the accessed information is signal-processed by the circuit driving part 120 and is recorded in or output from a computer.

Meanwhile, although the motor currently applied to skin washing uses a rotary motor or systems employing arc-form, spiral, reciprocal motions, the size of the product increases and current consumption also increases, reducing a life span of the battery.

Further, since a motor is rotated only in one direction according to the related art, the skin washing brush is also rotated in one direction when a washing liquid is applied to a face, resulting in a limit in the washing liquid uniformly contacting the skin.

SUMMARY OF THE INVENTION

Accordingly, the present invention has been made to solve the above-mentioned problems occurring in the prior art, and an object of the present invention is to apply a brushless electric motor to a skin washing apparatus such that the brushless electric motor is rotated forwardly and reversely at a predetermined period, lowering power consumption and operating the motor with low power while maximizing portability, and rotating a skin washing brush forwardly and reversely while maximizing contact of a washing liquid with skin.

In accordance with one aspect of the present invention, there is provided a skin washing apparatus using a brushless DC motor, including: a case for the skin washing apparatus; an operation unit installed outside the case, for commanding an ON/OFF operation of the skin washing apparatus and an switching operation for forward and reverse rotations in unit of a predetermined angle; a power supply installed at one end of an interior of the case; a brushless DC motor installed inside the case to be operated by electric power received from the power supply so as to be rotated forwardly and reversely in unit of a predetermined angle; a control unit for outputting an electrical signal for controlling forward and reverse rotations of the brushless electric motor by a predetermined angle in response to a switching signal of the operation unit; and a skin washing brush mounted on a shaft of the brushless electric motor to be rotated forwardly and reversely according to an operation of the brushless electric motor.

The control unit includes: position sensors located between the three phases of the motor to detect a relative position of the rotator with respect to the stator; a rectifying circuit for converting an AC power to DC power; a smoothing condenser for removing voltage pulsations of the converted DC power; an inverter circuit having a plurality of electric power devices, for applying the DC power having passes through the smoothing condenser to the motor with an AC voltage having desired average voltage and frequency according to a switching state of the power devices; a control circuit for controlling an inverter circuit based on a detection value of the position sensor; and a power source circuit for supplying electric power to the control circuit 540.

The control unit includes: a rectifying unit adapted to rectify and smooth AC power to supply DC power and including a rectifier and a smoothing capacitor; an inverter having six switching devices and diodes for converting the DC power supplied from the rectifying unit into three phase AC power in a waveform having an arbitrary variable frequency to supply the AC power to the BLDC motor; terminal voltage detecting unit for detecting terminal voltages of the phases from the three phase AC power supplied to the BLDC motor; a control circuit 570 for detecting a zero crossing point of a back electromotive force according to the terminal voltages of the phases detected by the terminal voltage detecting units to acquire position information of the rotator, and controlling a pattern of the PWM signal supplied to the inverter to rotate the rotator of the motor forwardly and reversely by a predetermined angle; and a PWM signal generating unit 580 for generating a pattern of the PWM signal according to an input of the control circuit, and supplying the pattern to the inverter.

In accordance with another aspect of the present invention, there is provided a method of controlling a skin washing apparatus using a brushless DC motor, the method including: if an operation unit outputs a switching signal, initially operating the brushless electric motor; detecting a back electromotive force according to rotation of a rotator while the brushless electric motor is initially operated; if a position of the rotator is detected, outputting a PWM driving signal for rotating the rotator forwardly and reversely by a predetermined angle with respect to the position; outputting a PWM driving signal for, if the rotator is rotated forwardly and reversely according to an angle range set by an operator, stopping the rotator and rotating the rotator reversely again.

In accordance with another aspect of the present invention, there is provided a program reading medium for performing a skin washing method using a brushless DC motor, the program reading medium including: a program code for, if an operation unit outputs a switching signal, initially operating a brushless electric motor; a program code for detecting a back electromotive force according to rotation of a rotator while the brushless electric motor is initially operated; a program code for, if a position of the rotator is detected, outputting a PWM driving signal for rotating the rotator forwardly and reversely by a predetermined angle with respect to the position; and a program code for outputting a PWM driving signal for, if the rotator is rotated forwardly and reversely according to an angle range set by an operator, stopping the rotator and rotating the rotator reversely again.

Accordingly, a brushless electric motor is applied to a skin washing apparatus such that the brushless electric motor is rotated forwardly and reversely at a predetermined period, lowering power consumption and operating the motor with low power while maximizing portability, and rotating a skin washing brush forwardly and reversely while maximizing contact of a washing liquid with skin.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
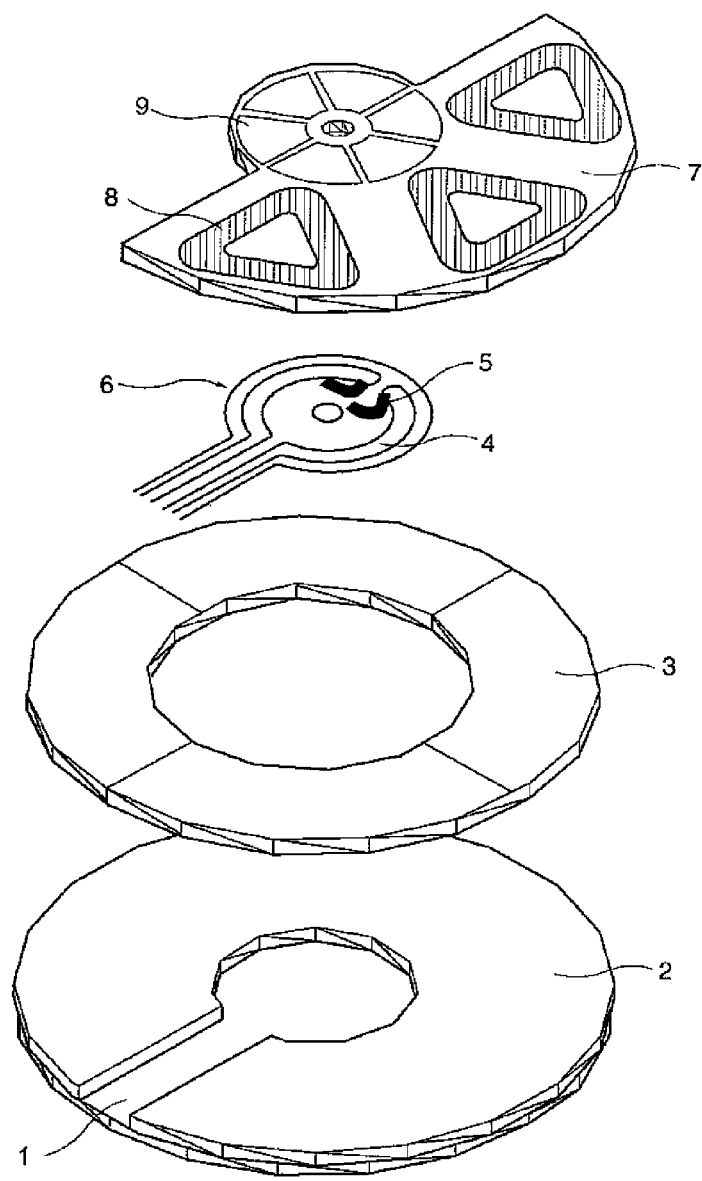
FIG. 1 shows a general eccentric rotation type vibration motor.
Figure 2:
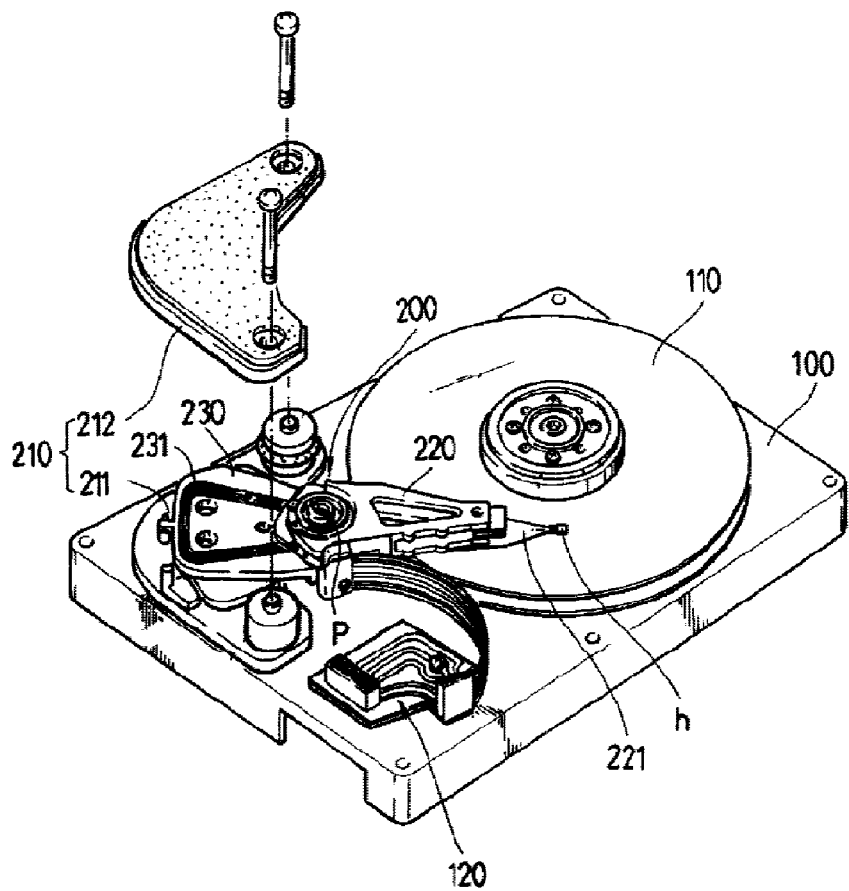
FIG. 2 shows a hard disk drive employing a voice coil.
Figure 3:
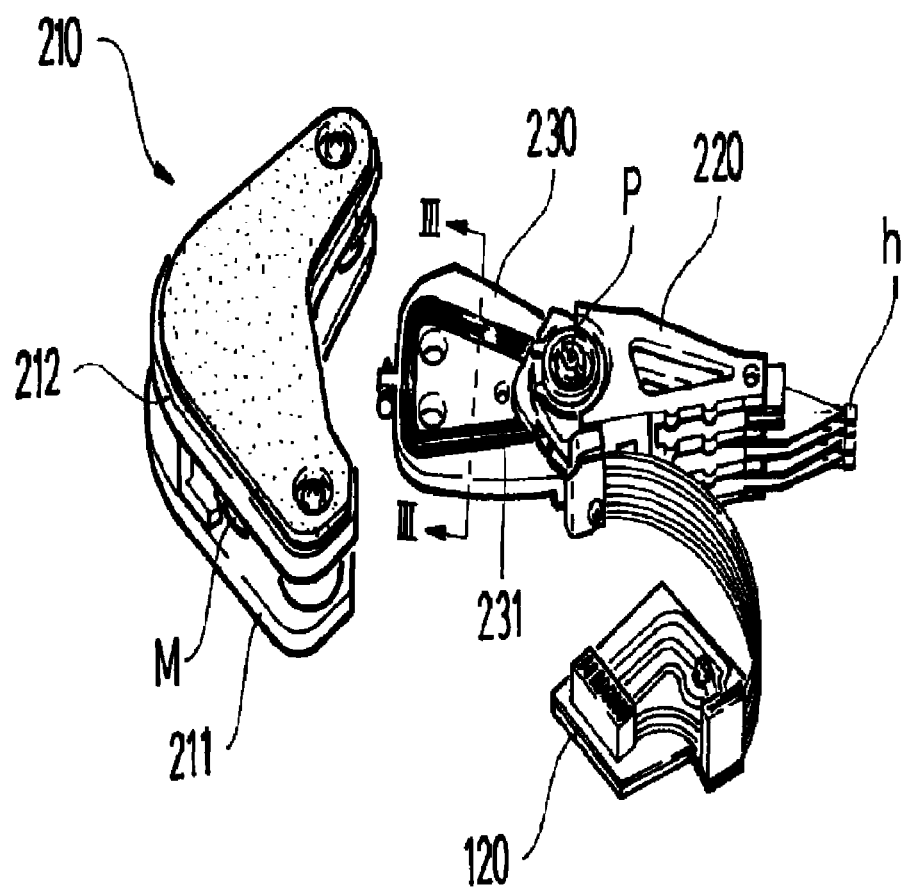
FIG. 3 shows an operation of an actuator employing a voice coil.

Hereinafter, exemplary embodiments of the present invention will be described in detail with reference to the accompanying drawings. In the following description and the accompanying drawings, the same elements will be denoted by the same reference numerals and a description thereof will not be repeated. In a description of the present invention, known functions and configurations will not be described when it may make the essence of the present invention obscure.

The functions of the following terms in the present invention are considered when the terms are set, and the meanings of the terms may be changed according to the intentions of manufacturers or customs. Thus, the terms should be defined based on the contents throughout the specification.

Figure 4A:
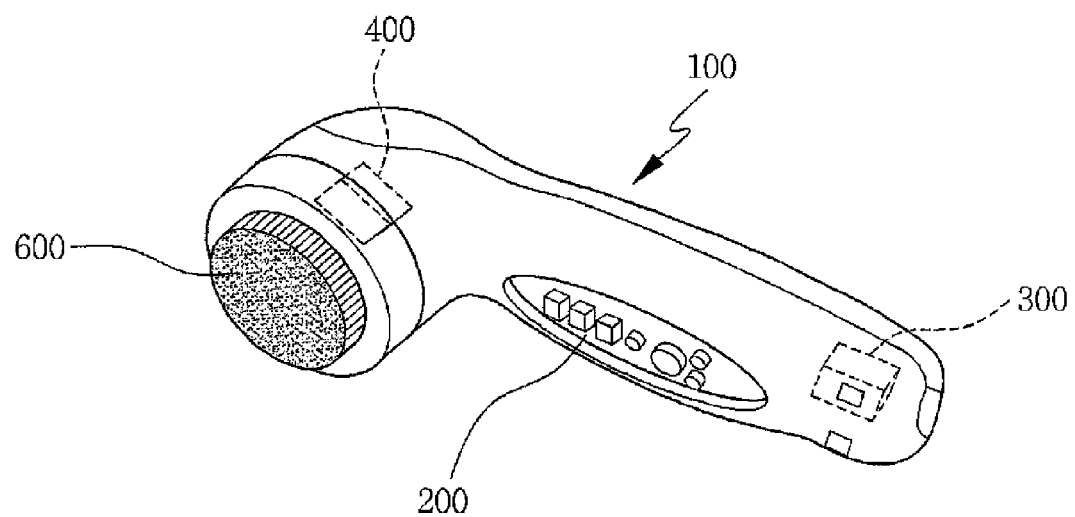
FIG. 4A shows an entire skin washing apparatus of the present invention.

FIG. 4A shows an entire skin washing apparatus of the present invention.

Figure 4B:
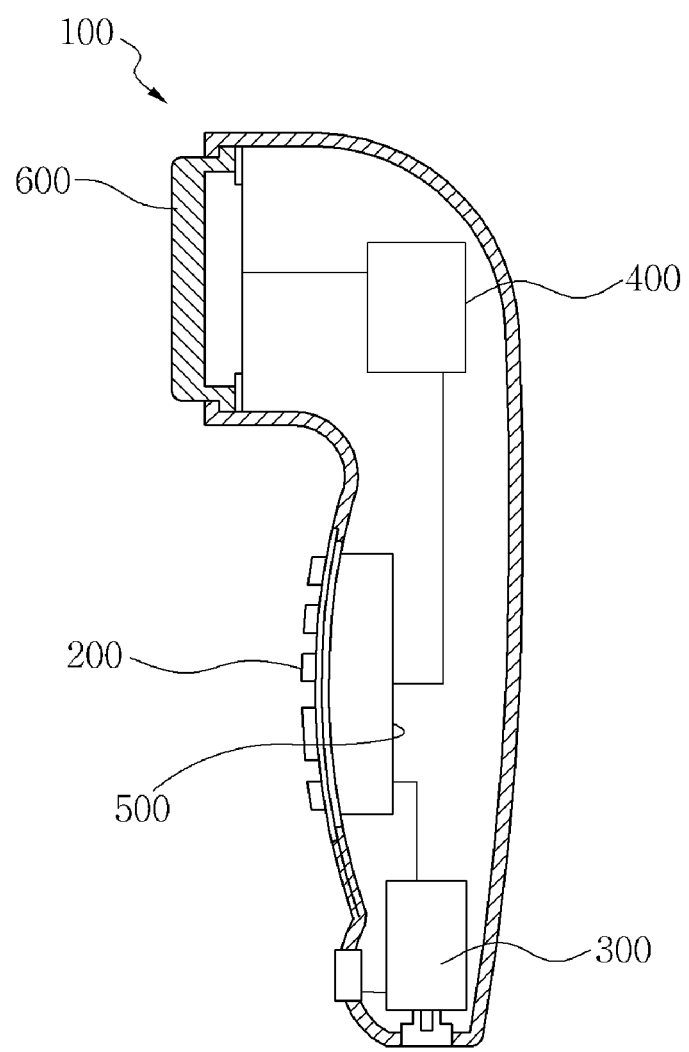
FIG. 4B shows a sectional view of FIG. 4A.

FIG. 4B shows a sectional view of FIG. 4A.

Figure 5:
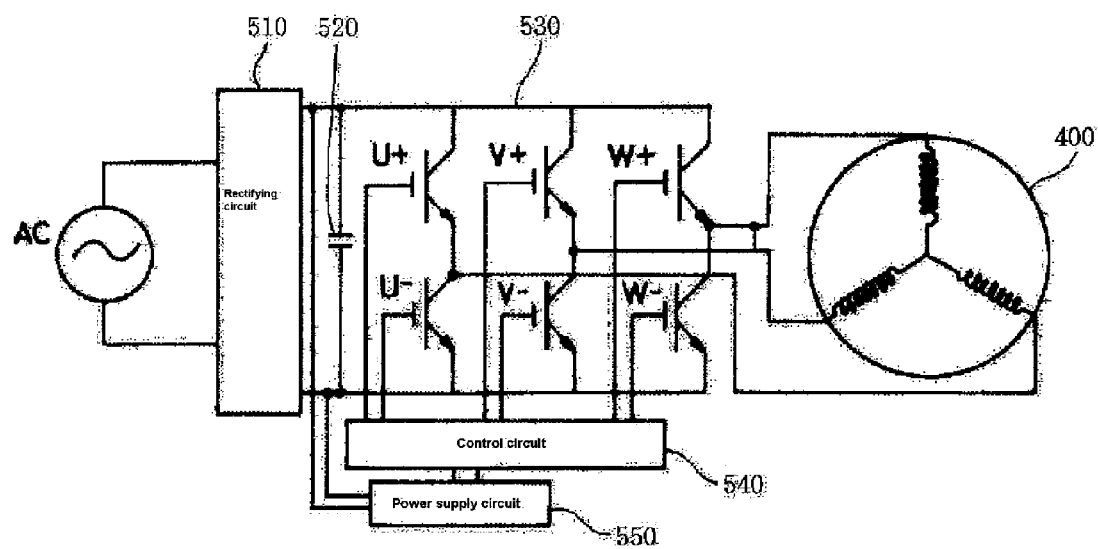
FIG. 5 shows a block diagram of a control unit circuit according to a first embodiment of the present invention.

FIG. 5 shows a block diagram of a control unit circuit according to a first embodiment of the present invention.

Figure 6A:
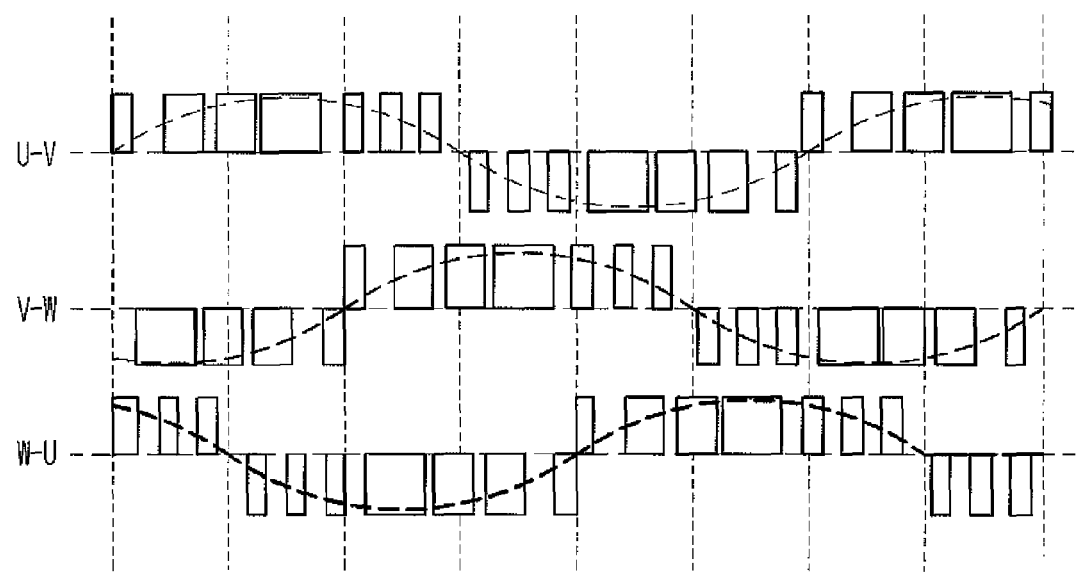
FIG. 6A and FIG. 6B shows position detection using a CT and a 180 degree sine wave control pattern diagram according to the present invention.
Figure 6B:
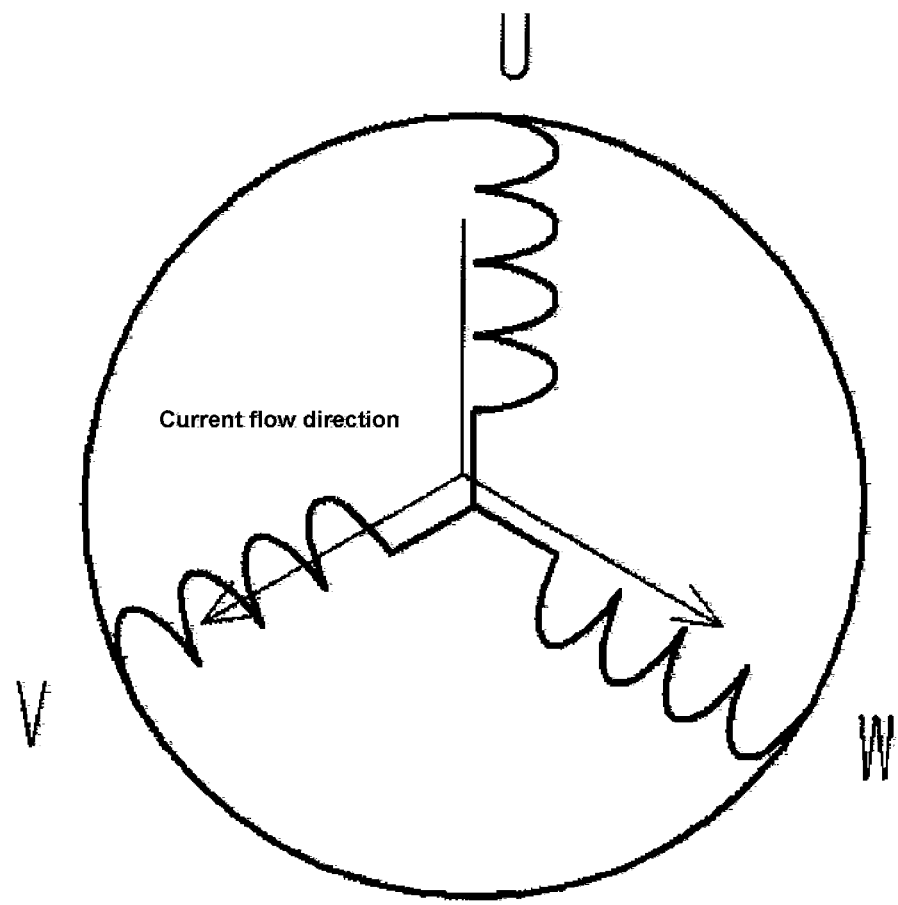

FIG. 6A and FIG. 6B shows position detection using a CT and a 180 degree sine wave control pattern diagram according to the present invention.

Figure 7A:
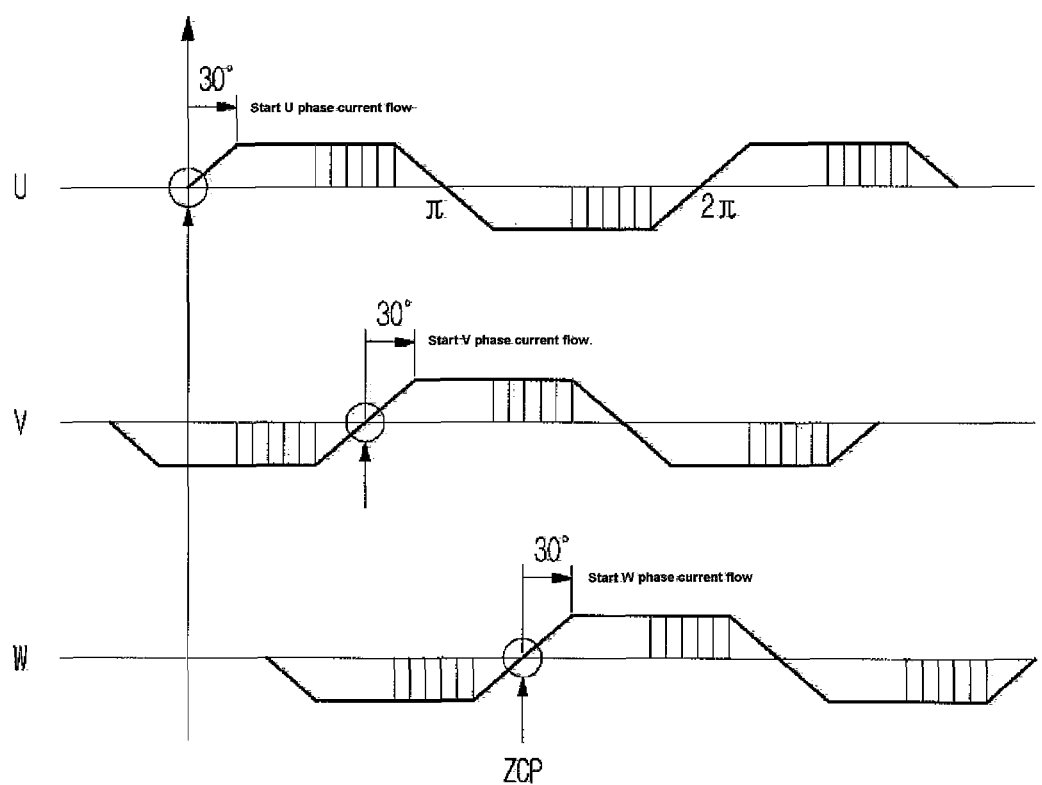
FIG. 7A and FIG. 7B shows position detection using a back electromotive force and a 120 degree square wave pattern diagram according to the present invention.
Figure 7B:
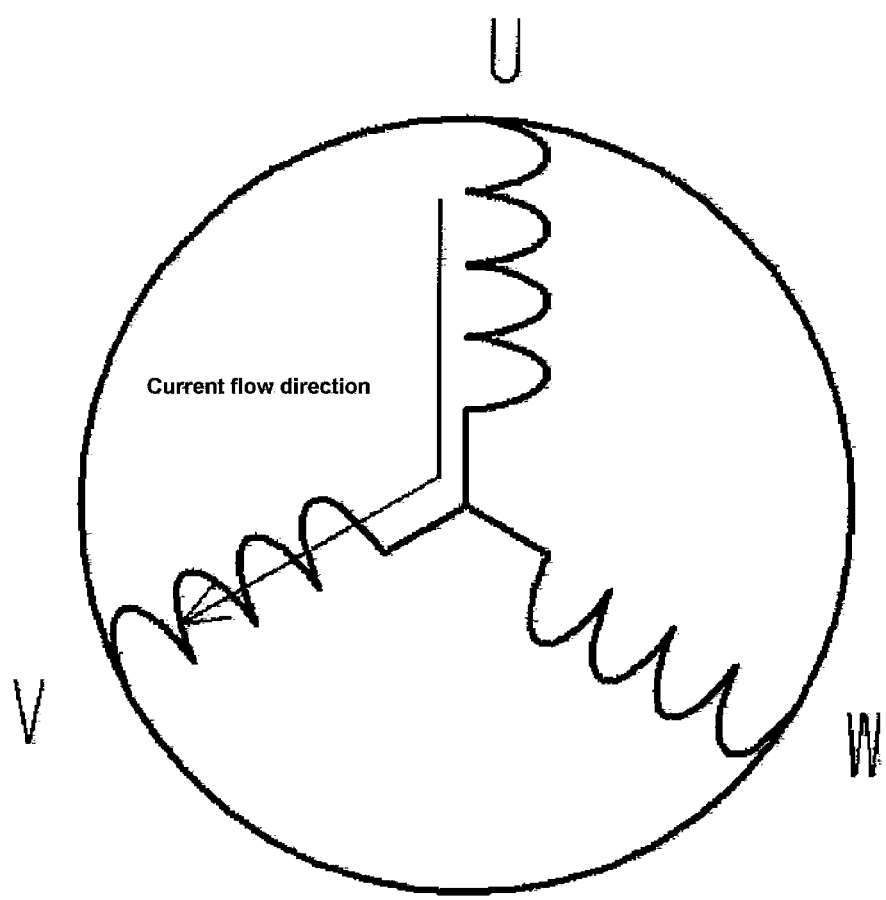

FIG. 7A and FIG. 7B shows position detection using a back electromotive force and a 120 degree square wave pattern diagram according to the present invention.

Figure 8:
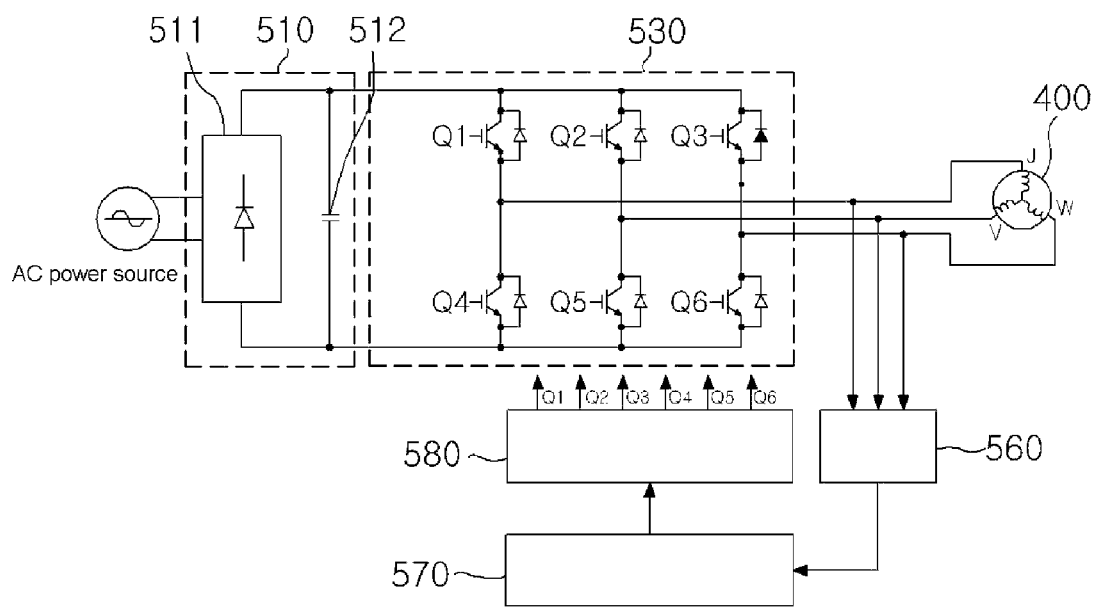
FIG. 8 shows a block diagram of a control unit pattern according to a second embodiment of the present invention.

FIG. 8 shows a block diagram of a control unit pattern according to a second embodiment of the present invention.

Figure 9:
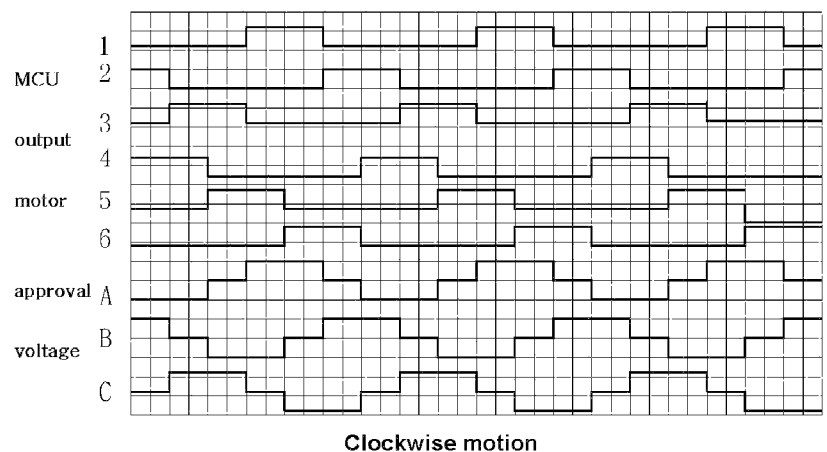
FIG. 9 shows a control unit output signal for operating a rotator clockwise and counterclockwise and a motor voltage application graph according to the present invention.
Figure 9:
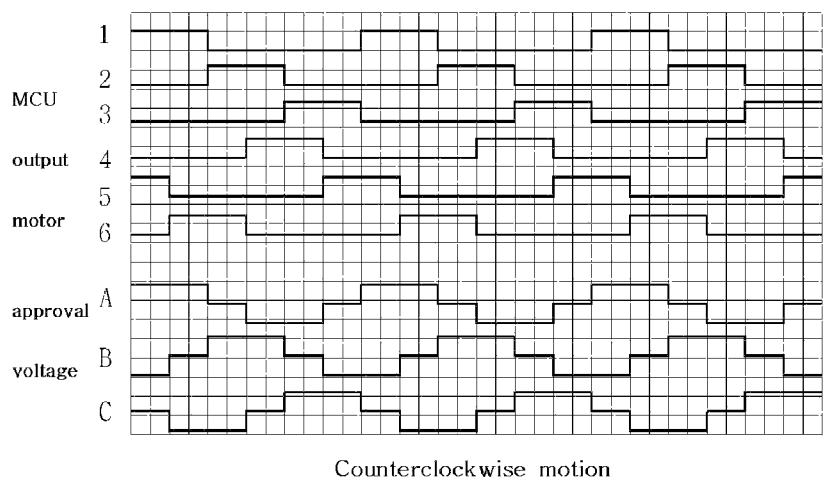

FIG. 9 shows a control unit output signal for operating a rotator clockwise and counterclockwise and a motor voltage application graph according to the present invention.

Figure 10:
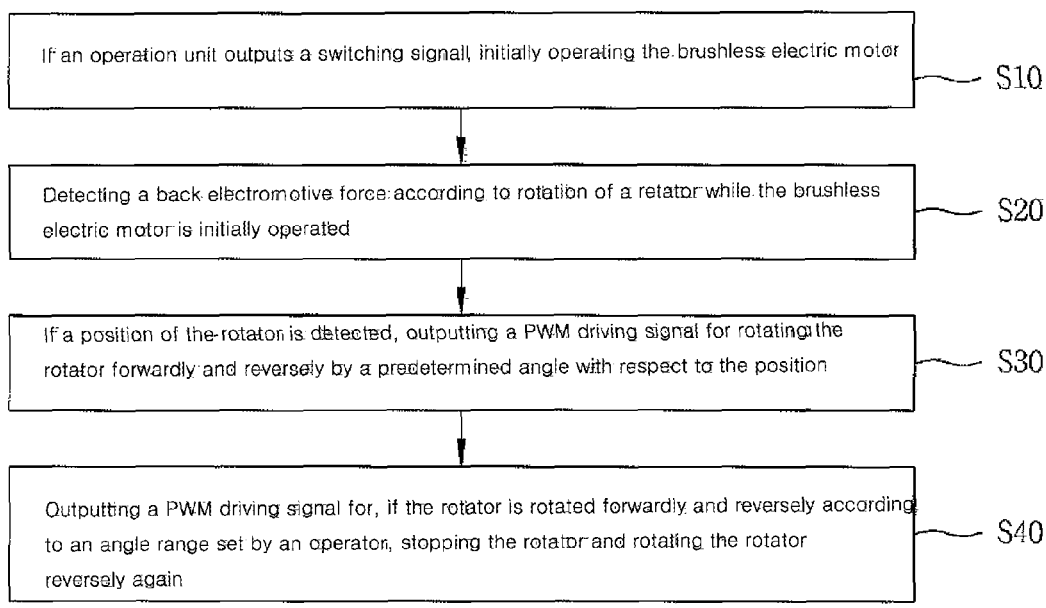
FIG. 10 shows a flowchart of a control operation of the present invention.

FIG. 10 shows a flowchart of a control operation of the present invention.

The skin washing apparatus according to the present invention includes a case 100 for a skin washing apparatus, an operation unit 200, a power supply 300, a brushless electric motor 400, a control unit 500, and a washing brush 600.

The case 100 forms an outer appearance of the skin washing apparatus such that it is held by a hand. The power supply and the brushless electric motor are received in the case and the operation unit is disposed outside the case.

The operation unit 200 is installed outside the case in the form of a toggle or a push button to command an ON/OFF operation of the power supply and a forward and reverse rotation of the brushless electric motor in unit of a predetermined angle, and guides a forward and reverse rotation of the brushless electric motor by a necessary angle.

The power supply 300 is installed within the case, and supplies electric power to the apparatus. In addition, it is apparent that the power supply may be a battery or a rechargeable battery, and may be connected to an external power supply to receive electric power through a cable.

The brushless electric motor 400 is installed within the case, and is operated by electric power received from the power supply in response to a switching signal of the operation unit to be rotated forwardly and reversely in unit of a predetermined angle.

The control unit 500 detects a back electromotive force from the brushless electric motor to recognize a location of the rotator, and outputs an electrical signal for controlling a forward and reverse rotation of the brushless electric motor by a predetermined angle in response to a switching signal of the operation unit.

The washing brush 600 is mounted on the brushless electric motor, and washes a face while being rotated forwardly and reversely according to an operation of the brushless electric motor.

The brushless electric motor (BLDC motor) 400 applied to the present invention essentially includes a stator for generating a rotational magnetic field which rotates spatially, and a rotator having a permanent magnet therein to form a magnetic field and relatively rotated in synchronization with a rotation speed of the rotational magnetic field, and includes a separate control unit for controlling rotation of the motor.

That is, the stator of the BLDC motor employs an armature for applying a current to a 3-phase coil, and the rotator employs a permanent magnet where N poles and S poles are repeatedly formed. A continuous rotational magnetic field of the BLDC motor is required to be formed to continuously rotate the BLDC motor, and a current flowing through the coils of the phases of the armature should be commutated at a proper time point to form a continuous rotational magnetic field, and a location of the rotator should be precisely recognized for proper commutation. Here, commutation refers to changing a direction of a current of a motor stator coil to rotate a rotator.

For a smooth operation of the BLCD motor, a location of the rotator and a conversion time point of the phase current should be precisely coincide with each other, in which case a unit for detecting a location of the rotator is necessary. In general, a Hall sensor whose potential difference is varied according to a change of a magnetic flux is used or a current transformer (CT) is installed in each phase of the stator to detect a location of the rotator.

As shown in FIG. 5, the control unit 500 includes position sensors (not shown) located between the three phases U, V and W of the motor to detect a relative position of the rotator with respect to the stator, a rectifying circuit 510 for converting an AC power to DC power, a smoothing condenser 520 for removing voltage pulsations of the converted DC power, an inverter circuit 530 having a plurality of electric power devices, for applying the DC power having passes through the smoothing condenser 520 to the motor with an AC voltage having desired average voltage and frequency according to a switching state of the power devices, a control circuit 540 for controlling an inverter circuit 530 based on a detection value of the position sensor, and a power source circuit 550 for supplying electric power to the control circuit 540. Here, reference numeral 1 denotes a BLDC motor (hereinafter, referred to as "a motor") expressed as an equivalent circuit.

The three position sensors Sa, Sb, and Sc located between the three phases U, V, and W of the motor 400 output detection values every 60 electric angle according to rotation of the rotator, in which case the power devices of the inverter circuit 530 are switched by a pulse width modulate (PWM) signal such that a current flows only through two phases of the three phases U, V, and W, and a current flows only through 120 electric angle section according to the electromotive forces EMF induced in the phases.

Meanwhile, since a Hall sensor cannot be mounted to a motor operated at a high temperature and a high pressure, it cannot be used to drive a compressor.

Meanwhile, a method of detecting a position of a rotator by using a CT is the most ideal control method, and corresponds to a vector control method in which a phase current obtained in each phase is coordinate-converted into two axes of d (directaxis) and q (quadraaxis) and a current is separated into a field current component and an armature current component to obtain a desired torque through control of a current. As shown in FIG. 6A, the voltage applied from each phase is in the PWM form, and the current waveform corresponds to a sine wave form shown by a dotted line. As shown in FIG. 6B, a current flows through all the three-phase coils of the BLDC motor to increase phase efficiency.

In this way, since the position detection using a CT may be performed through a 180 degree current flow control and both a back electromotive force and a current have sine waveforms, a torque ripple does not generated. Accordingly, excellent characteristics in efficiency, torque characteristics, noise, and vibration are shown, but a high-priced CT should be used to estimate a position of a rotator, considerably high technologies and trial and errors should be accompanied to construct unique vector control algorithm, and a price of a controller increases due to a complex control algorithm, requiring a high technology and high costs.

In order to solve this problem, a measure for detecting a position of a rotator by using an electric circuit has been sought to be found, and as a result, a method of detecting a position of a rotator by using a back electromotive force of a BLDC motor is currently most widely used.

As shown in FIG. 7B, in the position detection using a back electromotive force, current flows only through two coils of the three phase coils of the motor and the remaining one generates an electromotive force through a change in the magnetic field generated when a rotator is rotated to detect a position of a magnet in the rotator. Then, as shown in FIG. 7A, the electromotive force is obtained in the trapezoidal form, and a zero crossing point (ZCP) whose electromotive forces becomes zero in each phase such that current flows through each phase after a phase angle of 30 degrees from the position to continuously control the motor.

In FIG. 8, the control unit of the BLDC motor of the present invention includes a rectifying unit 510, an inverter 530, a terminal voltage detecting unit 560, a control circuit 570, and a PWM signal generating unit 580.

The rectifying unit 510 is adapted to rectify and smooth AC power to supply DC power, and includes a rectifier 511 and a smoothing capacitor 512.

The inverter 530 is adapted to convert the DC power supplied from the rectifying unit 510 to three-phase AC power U, V, and W in the form of a pulse having a variable frequency to supply the three-phase AC power U, V, and W to the BLDC motor 400, and corresponds to a general switching circuit having six switching devices Q1 to Q6 and six diodes.

The terminal voltage detecting unit 560 detects terminal voltages of the phases U, V, and W from the three phase AC power supplied to the BLDC motor 400, and inputs the terminal voltages to the control circuit 570.

The control circuit 570 corresponds to a microprocessor for detecting a zero crossing point (ZCP) of a back electromotive force according to the terminal voltages of the phases U, V, and W detected by the terminal voltage detecting unit 560 to acquire position information of the rotator, and controlling a pattern of the PWM signal supplied to the inverter 530, and the control circuit 570 performs a control algorithm for the entire inverter 530.

The PWM signal generating unit 580 generates a pattern of the PWM signal according to an input of the control circuit 570, and supplies the pattern to the inverter 530.

Hereinafter, an operation and an effect of a method of controlling the BLDC motor will be described.

The purpose of controlling position detection of the rotator of the BLDC motor 400 of the present invention is an ideal control without any torque ripple, and accordingly, sine waves are applied to both a voltage and a current of the BLDC motor. An initial driving algorithm is required to drive the BLDC motor 400 because a position of the magnet of the rotator is not known initially in any control method, and even in this case, a separate driving algorithm is necessary because a back electromotive force can be obtained only after the rotator starts to be rotated. The initial driving algorithm is a well known algorithm used in all controls of the BLDC motor 400 and uses a generally known compulsory arrangement method, and a detailed description thereof will be omitted.

In this way, once the initial position of the magnet of the rotator is obtained, the rotators are synchronously rotated in a determined order until the rotation frequency reaches a predetermined value to generate a back electromotive force. From this section, a sine wave control is started. The driving method is generally a sine wave control method of an AC induction motor or the same PWM control method. Meanwhile, the frequency of a converter may correspond to various methods such as a triangular or saw-tooth wave method or a circle approximation method.

A zero crossing point (ZCP) where an inductive electromotive force of each phase obtained due to rotation of a rotator passes through a zero cross is detected, and a phase is converted based on ZCP information to output a PWM driving signal to the corresponding phase. Since the three phase current flow is driven from then, the current waveform has the sine waveform.

Then, it is preferable that the BLDC motor 400 is wound in distribution winding to help detect the ZCP.

The present invention programs a control circuit to vibrate the skin washing brush while rotating the brushless electric motor forwardly and reversely.

That is, the rotator of the brushless electric motor is rotated by a predetermined angle and then the position of the rotator is checked by using the inductive electromotive force, and forward and reverse rotations of the skin washing brush are repeated by repeating forward and reverse rotations of the rotator.

Thus, as the skin washing brush is rotated forwardly and reversely, the skin can be easily washing, which is still more advantageous in washing wastes than to simply rotate the skin washing brush in one direction.

A program code of the control circuit for rotating the rotator of the motor forwardly and reversely within a predetermined angle range may be stored in various units and may be input to the control circuit to be driven. Example of recording media that can be read by a computer include a ROM, a RAM, a CD-ROM, a magnetic tape, a floppy disk, an optical data storage, and may be realized in the form of a carrier wave (for example, transmission over the Internet). Further, the recording media that can be read by a computer may be dispersed in a computer system connected through a network, and codes that can be read by a computer can be stored and executed in a dispersion method. Further, the functional programs, codes, and code segments for realizing the present invention can be easily deduced by the programmers in the field to which the present invention pertains.

As a result, the present invention applies a brushless electric motor and sets an operation mode such that a rotator of the brushless electric motor is rotated forwardly and reversely at a predetermined angle so that the skin washing brush can be rotated forwardly and reversely to wash the face more perfectly and conveniently.

What is claimed is:

1. A skin washing apparatus using a brushless DC motor, comprising:
  a case;
  an operation unit installed outside the case, for commanding an ON/OFF operation of the skin washing apparatus and a switching operation configured for forward and reverse rotations a predetermined angle;
  a power supply installed at one end of an interior of the case;
  a brushless DC motor installed inside the case to be operated by electric power received from the power supply so as to be rotated forwardly and reversely a predetermined angle;
  a control unit for outputting an electrical signal for controlling forward and reverse rotations of the brushless DC motor a predetermined angle in response to a switching signal of the operation unit; and
  a skin washing brush mounted on a shaft of the brushless DC motor to be rotated forwardly and reversely according to an operation of the brushless DC motor
  wherein the control unit comprises:

a rectifying unit adapted to rectify and smooth AC power to supply DC power and including a rectifier and a smoothing capacitor;

an inverter having six switching devices and diodes for converting the DC power supplied from the rectifying unit into three AC power in a waveform having an arbitrary variable frequency to supply the AC power to the brushless DC motor;

terminal voltage detecting unit for detecting terminal voltages of the phases from the three phase AC power supplied to the brushless DC motor;

a control circuit for detecting a zero crossing point of a back electromotive force according to the terminal voltages of the phases detected by the terminal voltage detecting unit to acquire position information of a rotator of the brushless DC motor, and controlling a pattern of a PWM signal supplied to the inverter to rotate the rotator of the brushless DC motor forwardly and reversely by a predetermined angle; and a PWM signal generating unit for generating a pattern of the PWM signal according to an input of the control circuit, and supplying the pattern to the inverter.

2. The skin washing apparatus of claim 1, wherein the control unit comprises:

position sensors located between the three phases of the brushless DC motor to detect a relative position of the rotator of the brushless DC motor with respect to a stator of the brushless DC motor;

a rectifying circuit for converting an AC power to DC power;

a smoothing condenser for removing voltage pulsations of the converted DC power;

an inverter circuit having a plurality of electric power devices, for applying the DC power having passes through the smoothing condenser to the motor with an AC voltage having desired average voltage and frequency according to a switching state of the power devices;

a control circuit for controlling an inverter circuit based on a detection value of the position sensors; and a power source circuit for supplying electric power to the control circuit.

* * * * *